J. G. HODGSON.
COMBINED FRICTION AND HERMETICALLY SEALED CAN.
APPLICATION FILED OCT. 27, 1913.

1,240,976.

Patented Sept. 25, 1917.

Witnesses.
Wm. Geiger
Esther Abrams.

Inventor:
John G. Hodgson
By Munday, Evarts, Adcock & Clarke
Attys.

UNITED STATES PATENT OFFICE.

JOHN G. HODGSON, OF MAYWOOD, ILLINOIS, ASSIGNOR TO AMERICAN CAN COMPANY, OF NEW YORK, N. Y., A CORPORATION OF NEW JERSEY.

COMBINED FRICTION AND HERMETICALLY-SEALED CAN.

1,240,976.

Specification of Letters Patent. Patented Sept. 25, 1917.

Application filed October 27, 1913. Serial No. 797,534.

*To all whom it may concern:*

Be it known that I, JOHN G. HODGSON, a citizen of the United States, residing in Maywood, in the county of Cook and State of Illinois, have invented a new and useful Improvement in Combined Friction and Hermetically-Sealed Cans, of which the following is a specification.

This invention relates to improvements in combined friction and hermetically sealed cans.

An object of the invention is to provide an hermetically gasket sealed can in which the gasket seal is maintained by the aid of a frictionally held retaining member or cover.

Another object of the invention is to provide a can employing a sealing gasket interposed between the can top and a cap in which the gasket is compressed and held compressed with a more or less yielding or elastic pressure maintained by the aid of a friction cover.

The invention furthermore consists in the improvements in the parts and devices and in the novel combination of the parts and devices as herein shown, described or claimed.

Figure 1:
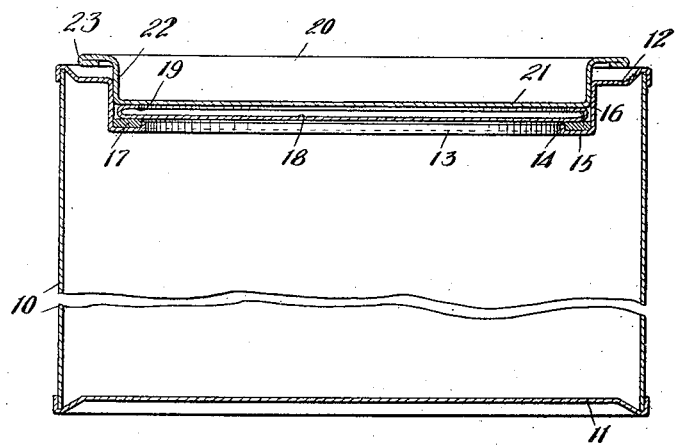
Figure 2:
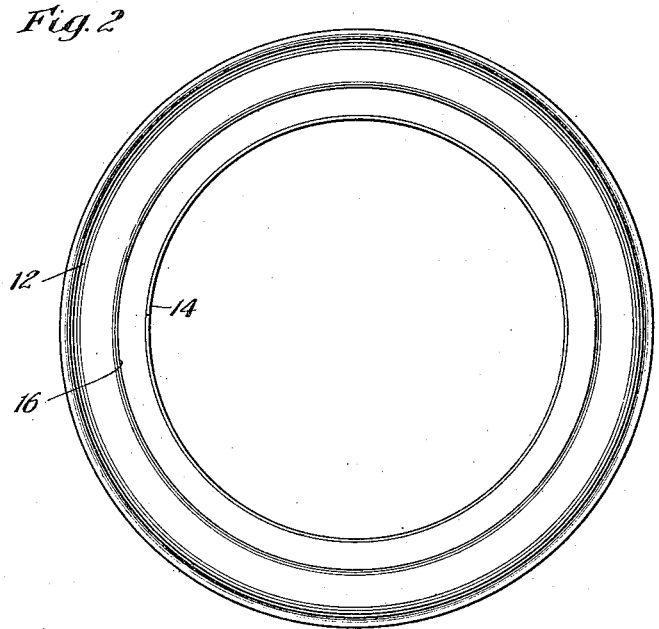

In the drawing forming a part of this specification, Figure 1 is a vertical, diametrical sectional view of a container embodying my improvements. Fig. 2 is a top plan view of the container shown in Fig. 1, the cover and cap being removed, and Fig. 3 illustrates another form of a container embodying my improvements.

In the structure shown in Figs. 1 and 2, the can body is designated by the reference 10, said body having a bottom 11 and top 12 secured thereto in any suitable manner, the top being provided with the usual central opening 13 defined by an upwardly turned inner flange 14 of the can top. The top is also provided with a horizontal flange 15 and substantially vertically extending friction wall 16, the portions 14, 15 and 16 forming an annular channel in which is adapted to be placed a gasket 17 formed of paper, rubber or other suitable material. A cap 18 is provided which extends over the opening 13 and has an upwardly and inwardly turned annular flange 19 spaced slightly from the plane of the main portion thereof for a purpose hereinafter specified.

A friction cover 20 is provided, the same having a countersunk central portion 21 and friction seat wall 22 coöperable with the friction seat wall 16 of the top. Said cover is furthermore preferably provided with a pryoff rim 23.

Figure 3:
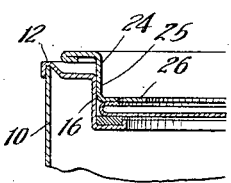

Instead of a complete friction cover as shown in Fig. 1, an annular cap retaining member 24 may be provided as shown in Fig. 3, the same having an annular friction seat wall 25 coöperable with the friction seat wall 16 of the can top, the annular member 24 having also an inwardly extending horizontal flange 26 adapted to engage the inturned or curled edge of the cap.

As will be understood, the under side of the edge of the cap engages the gasket supported by the can top and is pressed into engagement therewith when the friction cover is forced home and on account of the inturned or curled edge of the cap, there will be an additional elastic or yielding pressure between the gasket and the cover, thus providing automatic means for compensating for unevenness in the parts and any slight "setting" or deterioration of the gasket after the can has been sealed. The friction contact between the coöperating friction seat walls of the top and cover will positively hold the cover in place so that the latter will maintain a perfect hermetic seal between the can cap and gasket ring and in the construction where a true cover is used as shown in Figs. 1 and 2, a friction seal will of course be provided in addition to the hermetic gasket seal.

From the foregoing description it will be seen that I have provided a combined friction and hermetically sealed can which is particularly adapted for household use in preserving or canning fruits and the like, the can being adapted for use any desired number of times, the only part which would have to be replaced or renewed from year to year being the gasket. The can thus provided is fully as efficient in providing an hermetic seal as the common type of glass jars now ordinarily used for household canning and the same possesses several advantages over glass jars among which may be mentioned those of cheaper first cost, absence of loss from breakage and ease in applying the closure.

Although I have herein shown and descrbed what I now consider the preferred embodiment of my improvement, yet it will be understood that various changes and modifications may be made without departing from the spirit of the invention, and all such changes and modifications are contemplated as come within the scope of the claims appended hereto.

I claim:

1. A container of the character described including, in combination: a body having a top provided with a hole, said top having an internal friction wall and a gasket supporting ledge; a gasket on said ledge; a cap having a doubled elastic peripheral portion and adapted to be seated on said top to close the opening therein, the edge of said cap extending over and engaging the gasket; and a retaining member for said cap having an external friction wall coöperable with the friction wall of the top, said member being independent of and engaging the cap and adapted to press the same firmly into engagement with the gasket, substantially as specified.

2. A container of the character described including, in combination: a body provided with a top having a hole therein, said top having a gasket supporting ledge and a friction wall; a gasket supported on said ledge; a cap having a curled and inturned edge spaced from the main portion thereof; and a cap retaining member having a friction wall coöperable with the friction wall of the top, said member engaging the cap to press the latter firmly into engagement with the gasket, the spaced inturned edge of the cap affording an additional yielding pressure on the gasket, substantially as specified.

3. A container of the character described including, in combination: a body provided with a top having an opening therein, said top having a gasket supporting ledge; a gasket mounted on said ledge; a cap adapted to close the opening in said top and having its edge in engagement with said gasket; and a retaining member in engagement with said cap and adapted to press the latter firmly against the gasket, said retaining member being frictionally held in position and said cap having a spring yielding action, substantially as specified.

4. A container of the character described including, in combination: a body provided with a top having a central opening therein, said top having an annular channel and a substantially vertically extending friction seat wall; a gasket located in said channel; a cap having a curled inturned edge spaced from the main portion thereof, said cap being adapted to be seated on said gasket; and a cover having a friction seat wall coöperable with the friction seat wall of the top and having a portion thereof in engagement with said inturned edge of the cap, whereby the can is provided with an hermetic and a friction seal, substantially as specified.

Signed this 9th day of October, 1913, in the presence of two witnesses.

JOHN G. HODGSON.

Witnesses:
WILLIAM A. GEIGER,
JOSEPH HARRIS.